United States Patent [19]

Hasegawa et al.

[11] 4,449,903
[45] May 22, 1984

[54] APPARATUS FOR LOADING AND UNLOADING TIRES FOR A TIRE VULCANIZING MACHINE

[75] Inventors: Akira Hasegawa; Katsuyoshi Sakaguchi, both of Nagasaki, Japan

[73] Assignee: Mitsubishi Jukogyo Kabushiki Kaisha, Tokyo, Japan

[21] Appl. No.: 513,667

[22] Filed: Jul. 14, 1983

[30] Foreign Application Priority Data

Jul. 14, 1982 [JP] Japan ............................... 57-122607
Jul. 15, 1982 [JP] Japan ............................... 57-123301

[51] Int. Cl.³ ............................................. B29H 5/02
[52] U.S. Cl. ........................................................ 425/38
[58] Field of Search ................... 425/28 R, 29, 32, 33, 425/38, 43, 44

[56] References Cited

U.S. PATENT DOCUMENTS

| | | | |
|---|---|---|---|
| 1,326,874 | 12/1919 | MacBeth et al. | 425/38 |
| 1,407,193 | 2/1922 | Diescher | 425/38 X |
| 1,931,638 | 10/1933 | Abbott | 425/33 |
| 3,222,715 | 12/1965 | Harris | 425/32 |
| 3,380,115 | 4/1968 | Soderquist | 425/38 |
| 3,522,626 | 8/1970 | Balle | 425/38 |
| 3,564,649 | 2/1971 | Soderquist | 425/29 |
| 3,738,893 | 6/1973 | Edler | 425/44 X |
| 4,391,769 | 7/1983 | Ichikawa et al. | 425/38 X |

*Primary Examiner*—J. Howard Flint, Jr.
*Attorney, Agent, or Firm*—Birch, Stewart, Kolasch & Birch

[57] ABSTRACT

An apparatus for loading or unloading tires for a tire vulcanizing machine is disclosed which essentially comprises a pair of vertically extending guide rods fixedly secured to a housing of the tire vulcanizing machine, a common board slidably fitted onto said guide rods so as to be displaced in the vertical direction with the aid of driving means, a pair of booms adapted to be displaced in the vertical direction together with said common board, each of said booms being turnable about the guide rod, tire grasping means including a plurality of grasping pawls at the one end of each of the booms, and means for limiting the extent of turning movement of the boom.

16 Claims, 10 Drawing Figures

APPARATUS FOR LOADING AND UNLOADING TIRES FOR A TIRE VULCANIZING MACHINE

DETAILED DESCRIPTION OF THE INVENTION

The present invention relates to an apparatus for loading or unloading tires for a tire vulcanizing machine.

As is well known, a loader serves to transfer green tires into a tire vulcanizing machine, whereas an unloader serves to transfer vulcanized tires from the tire vulcanizing machine to a post-cure inflator on which they are subjected to air cooling after completion of vulcanization. The present invention is intended to provide an apparatus serving as both loader and unloader.

As disclosed by the official gazette of Japanese Patent Laid-Open No. 36785/77, a conventional swing type loader for a tire vulcanizing machine is separately arranged at both the sides of a housing of the tire vulcanizing machine so as to vulcanize two green tires simultaneously and moreover a raising and lowering device such as cylinder or the like means is disposed for each of the loaders so as to raise up or lower a tire. Due to the arrangement of the loaders in the above-mentioned manner they have disadvantageous features from the viewpoint of cost and maintenance service.

Further, to locate the loaders in alignment with the center of the housing of the tire vulcanizing machine a stationary stopper is disposed at the position located in the proximity of the middle part of swinging movement. Thus, another disadvantageous feature of the conventional loader is that it has a reduced stability particularly at the center of a tire during loading operation in the tire vulcanizing machine because the stationary stopper is exposed to high intensity of force caused by inertia of the tire to be loaded.

On the other hand, a conventional unloader for a tire vulcanizing machine is generally operated by way of the steps of causing a vulcanized tire to fall down from an elevated position, displacing it on a series of rollers on an inclined conveyor under gravity force of its own weight, stopping it at the predetermined position with the aid of a stopper disposed on a post-cure inflator (hereinafter referred to as P.C.I.) while locating it in alignment with the center of P.C.I., and finally causing it to inflate while it is grasped on P.C.I. However, it is found that the conventional unloader has a disadvantageous feature because precise alignment of it with the center of P.C.I. is not always measured. To improve accuracy of alignment there have been already made several proposals as disclosed in Japanese Patent Application No. 57,733/78 and Japanese Patent Application No. 1,074/79 but it is found that any of the prior proposals has the following drawbacks.

The unloader as disclosed in Japanese Patent Application No. 57,733/78 is constructed such that a vulcanized tire is transferred directly to P.C.I. by means of a chuck mounted on a movable beam but it has the following drawbacks.

(1) The unloader can be applied only to a wire vulcanizing machine on which an upper die half is displaced by swinging movement in the horizontal direction but it cannot be employed for a tire vulcanizing machine on which an upper die half is displaced only in the vertical direction by raising and lowering movement.

(2) The chuck is adapted to be fitted to a bladder grasping ring on a tire vulcanizing machine and therefore it is complicated in configuration and structure.

(3) The movable beam is heavy in weight and therefore careful precausion should be taken so as to assure its exact stoppage.

Further, the unloader as disclosed in Japanese Patent Application No. 1.074/79 is constructed such that a vulcanized tire is first discharged on an inclined roller conveyor and it is then transferred to P.C.I. while ie is grasped by means of a chuck but it has the following drawbacks.

(1) As the weight of a tire is increasingly reduced, it becomes difficult that the unloader assumes the horizontal posture merely by its own dead weight while the tire is held at the inclined state. Further, due to the fact that the tire is very flexible particularly at the side wall portion thereof it is unstable that it is located on the inclined conveyor by utilizing its outer periphery. As a result it cannot be grasped by means of a chuck.

(2) There is necessity for arranging a discharging device for discharging a vulcanized tire from the tire vulcanizing machine onto the inclined conveyor, said discharging device being usually complicated in structure.

Thus, the present invention has been made with the foregoing problems in mind and its object resides in providing an apparatus for loading or unloading tires for a tire vulcanizing machine which is simple in structure and can be manufactured at an inexpensive cost.

Other object of the present invention is to provide an apparatus for loading or unloading tires for a tire vulcanizing machine which assures that correct alignment is achieved at high accuracy.

Another object of the present invention is to provide an apparatus for loading tires for a tire vulcanizing machine which assures that green tires are loaded on the tire vulcanizing machine at improved accuracy while the center of a green tire to be vulcanized is located in correct alignment with the center of the tire vulcanizing machine.

Still another object of the present invention is to provide an apparatus for loading tires for a tire vulcanizing machine which assures improved dimensional accuracy of valcanized tires and can be manufactured at an inexpensive cost.

Further another object of the present invention is to provide an apparatus for unloading tires for a tire vulcanizing machine which is free from any of the drawbacks as mentioned above with respect to the conventional apparatus.

To accomplish the above objects there is proposed in accordance with the present invention an apparatus for loading or unloading tires for a tire vulcanizing machine which is characterized in that said apparatus essentially comprises a pair of vertically extending guide rods fixedly secured to a housing of the tire vulcanizing machine, a common board slidably fitted onto said guide rods so as to be displaced in the vertical direction with the aid of driving means, a pair of booms adapted to be displaced in the vertical direction together with said common board, each of said booms being turnable about the guide rod, tire grasping means including a plurality of grasping pawls disposed at the one end of each of the booms, said grasping pawls being adapted to expand or contract, and means for limiting the extent of turning movement of the boom.

Since the apparatus of the invention is constructed such that a pair of booms are displaced in the vertical direction together with a common board, there is necessity only for arranging one set of driving means for displacing them in the vertical direction. Thus, the apparatus is simple in structure and can be manufactured at an inexpensive cost. Further, since there is provided means for limiting the extent of turning movement of the boom, correct alignment is achieved at high accuracy.

Further, there is proposed in accordance with other aspect of the present invention an apparatus for loading tires for a tire vulcanizing machine which is characterized in that said apparatus essentially comprises a hydraulic cylinder fixedly secured to a stationary bracket, said hydraulic cylinder including an actuating rod adapted to expand or contract in the vertical direction, a pair of vertically extending guide rods fixedly mounted on said bracket, a common board slidably fitted onto the pair of guide rods at the one end part thereof, said common board being adapted to move up and down with the aid of said hydraulic cylinder of which actuating rod is fixedly connected to the common board at its uppermost end, a pair of booms slidably fitted onto the guide rods at the one end part and carrying tire grasping means at the other end part thereof, said tire grasping means comprising a plurality of grasping pawls adapted to expand and contract, a pair of second hydraulic cylinders for turning each of the booms about the guide rods, the one end part of each of said second hydraulic cylinders being operatively connected to the boom at the position located intermediate the common board and the boom, and a pair of stopper rods operatively connected to the common board at the one end part and carrying a stop member at the other end part thereof, each of said stopper rods extending through a hole on a stopper turnably disposed at the middle part of the boom in such a manner as to slide through said hole as the boom is turned.

Since the apparatus of the invention is constructed such that a common board is slidably fitted onto two guide rods and the positional height of the common board is determined by raising up or lowering it with the aid of a hydraulic cylinder, there occurs a few amount of deflection of the guide rods when the latter are exposed to the influence of force from the outside. Further, since undesirable displacement of the common board caused due to the existence of clearance between the guide rod and the common board can be substantially reduced owing to the arrangement of the two long guide rods, it is assured that a green tire is reliably grasped at the correct position with the aid of tire grasping means when it is loaded on a tire vulcanizing machine, resulting in precise loading of the green tire achieved. Further, since only one set of hydraulic cylinder is provided for the purpose of raising up or lowering the common board, operations of the apparatus are carried out at an inexpensive cost. Moreover, a stroke of turning movement of the boom can be easily adjusted merely by adjusting the position of a stop member disposed at the free end of each of the stopper rods. Since the position where the boom is stopped can be mechanically determined by causing the stop member to abut against a stopper, it is assured that the apparatus is simple in structure and correct location can be determined reliably.

Further, there is proposed in accordance with another aspect of the present invention an apparatus for unloading tires for a tire vulcanizing machine which is characterized in that said apparatus essentially comprises a pair of vertically extending guide rods disposed at the predetermined position located between the tire vulcanizing machine and the post-cure inflator, each of said guide rods being fixedly secured to the tire vulcanizing machine by way of a bracket extending therebetween, a pair of booms slidably fitted onto the guide rods at the one end part thereof so as to turn between two positions with the aid of hydraulic cylinders, one of said positions being the center of a die on the tire vulcanizing machine while the other one being the center of post-cure inflator rings on the post-cure inflator, each of said booms being adapted to move up and down along the guide rods, and tire grasping means disposed at the other end part thereof for grasping a vulcanized tire at the bead portion, said tire grasping means including a plurality of grasping pawls adapted to expand and contact.

Since the apparatus of the invention is constructed such that each of the booms is displaced between two positions by way of turning movement initiated by a hydraulic cylinder, one of said two positions being the center of a tire vulcanizing machine and the other one being the center of a post-cure inflator, it is assured that correct alignment is reliably achieved at high accuracy. Further, since each of the booms is displaceable in the vertical direction and moreover it is turnable about the guide rod, either of the booms can be easily brought into the space between both the upper and lower die halves which are parted away from one another in the vertical direction so that a vulcanized tire is grasped with the aid of tire grasping means without any interference encountered. Another advantageous feature of the apparatus is that it is simple in structure and therefore can be manufactured at an inexpensive cost.

Other objects, features and advantages of the present invention will be more clearly apparent from reading of the following description which has been prepared in conjunction with the accompanying drawings. It should be noted that the following four embodiments have been described with respect to a loader and an unloader but their technical concept is practically identical to each other.

The accompanying drawins will be briefly described below.

Now, the present invention will be described in a getarer detail hereunder with reference to the accompanying drawings which illustrate preferred embodiments of the invention.

Figure 1:
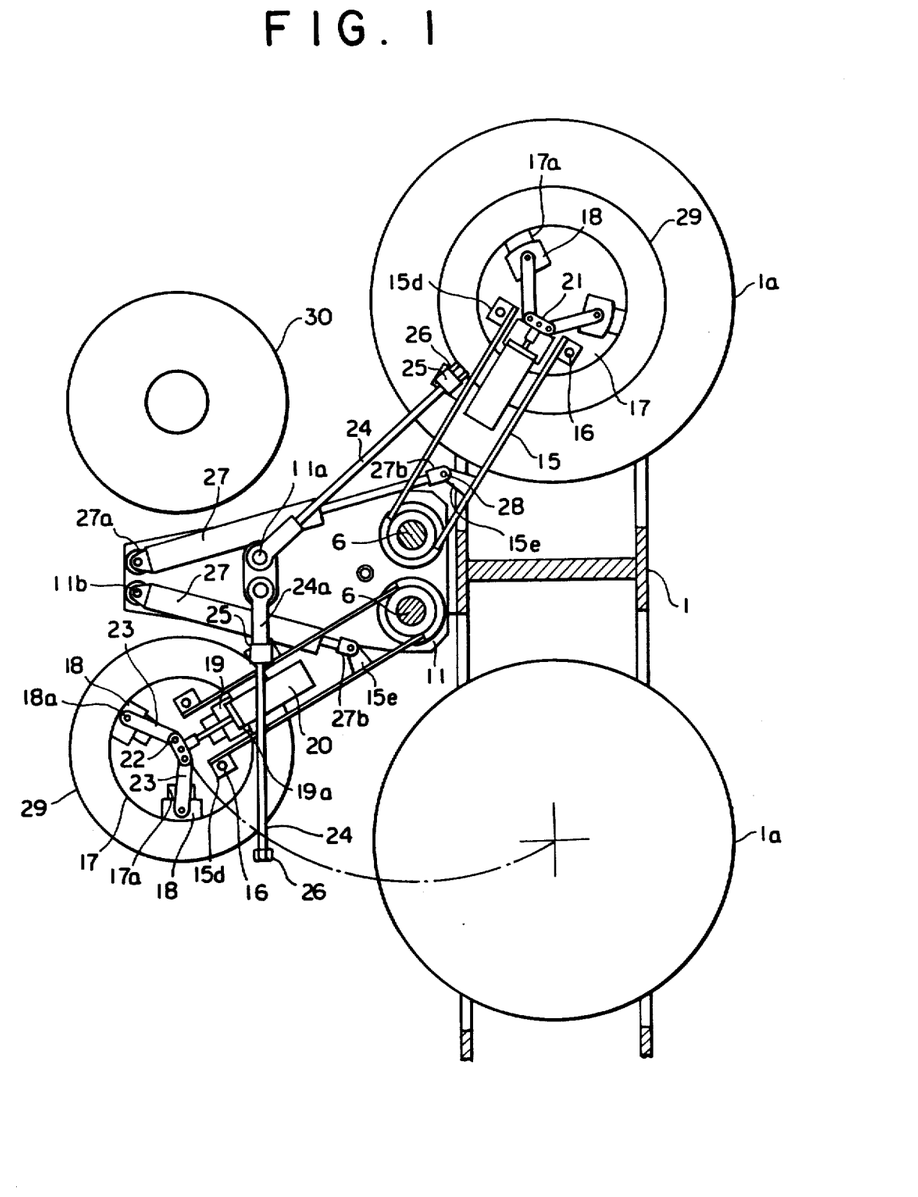
FIG. 1 is a plan view of a loader in accordance with the first embodiment of the invention.

First, a loader in accordance with the first embodiment of the invention will be described with reference to FIGS. 1 to 3.

As will be apparent from the drawings, a housing 1 of a tire vulcanizing press includes a bracket 3 fixedly secured to the lower part thereof by means of a plurality of bolts 2. A hydraulic cylinder 4 is fixedly mounted on the upper surface of the bracket 3 by means of a plurality of bolts 5 and moreover two vertically extending guide rods 6 are attached to the bracket 3 by means of bolts 7. The upper end part of the guide rods 6 is fitted into a hole on a support member 8 which is fixed to the housing 1 by means of bolts 9. A common board 11 slidably fitted onto the guide rods 6 is operatively connected to the hydraulic cylinder 4 by screwing the male threaded upper end part of an acutaing rod of the hydraulic cylinder 4 into the female threaded hole on the common board 11. The common board 11 includes two cylindrical projections formed at the right end part thereof as seen in the drawing in which two ball bearings 12 are inserted, outer race of said ball bearings 12 being firmly held by means of a cover 13 and bolts 14. A pair of booms 15 are turnably supported above the common board 11 in such a manner that bushes 16a and 16b press fitted into both the upper and lower ends of a vertically extending cylinderical end portion 15a are slidably fitted onto each of the guide rods 6. The other end portion 15d of the booms 15 are fixedly secured to a chuck casing 17 by means of bolts 16.

The chuck casing 17 is formed with three guide grooves 17a through which two pawls 18 and another pawl 19 are slidably inserted. Each of the pawls 18 has a rod 18a integrally formed on the upper end, whereas the pawl 19 has a flange 19a integrally formed on the upper end thereof so that a hydraulic cylinder 20 is fixed to said flange 19a with the aid of bolting means or the like. The hydraulic cylinder 20 includes a crevice 20a at the foremost end of its actuating rod and plates 21 with three pin holes formed thereon are superimposed on both the upper and lower faces of said crevice 20a. Three pins 22 are loosely fitted into the holes on the plates 21 and one end part of levers 23 is operatively engaged to the pins 22 located outside relative to the actuating cylinder 20. The other end part of the levers 23 is operatively engaged to the pin 15a on the pawls 18.

A pair of stopper rods 24 are turnably fitted to pin 11a projecting upward above the common board 11 by causing said pin 11a to be inserted through a pin hole on the one end 24a of the stopper rods 24. The middle part of the stopper rods 24 is designed in the form of a round shaft adapted to be slidably inserted through a hole on a stopper 25. Each of the stopper rods 24 has a male threaded part at the one end thereof and a nut 26 is screwed on the male threaded end part and locked by utilizing suitable locking means.

As will be readily apparent, a range of turning movement of the booms 15 can be adjusted as required by changing the position where the nut 26 is locked.

Figures 2, 3:
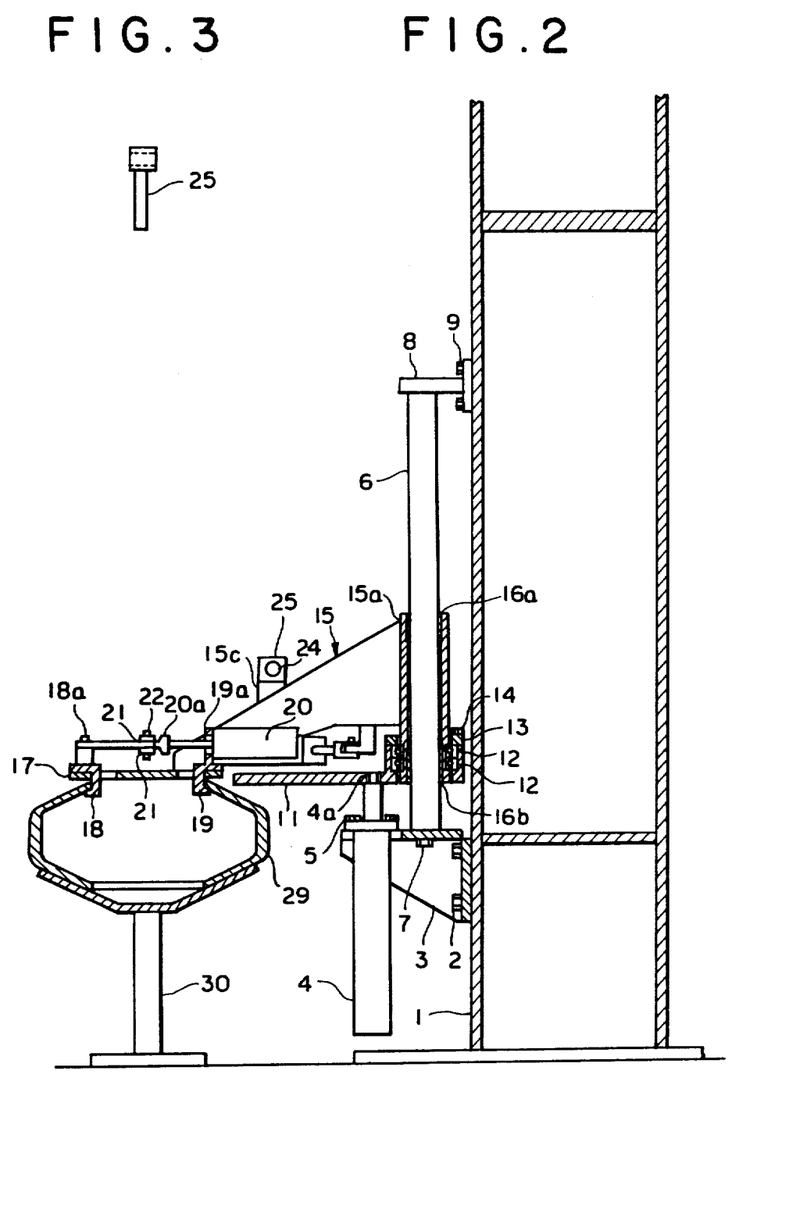
FIG. 2 is a sectional side view of the loader in FIG. 1.
FIG. 3 is the whole view of a stopper turnably disposed on a boom constituting the loader as illustrated in FIGS. 1 and 2.

As illustrated in FIG. 3, the lower part of the stopper 25 has the shaft-shaped configuration so that it is loosely fitted into a hole on a support rod 15c having a square cross-sectional configuration, said support rod 15c being fixedly mounted on the booms 15. A pair of hydraulic cylinders 27 have a crevice 27a at their rear end which is loosely fitted onto a pin 11b projecting upward above the common board 11 and the foremost end part 27b of the hydraulic cylinders 27 is operatively engaged to the boom 15 by way of a projection plate 15e fixedly secured to the boom 15 and a pin 28 extending through the foremost end part 27b and the projection plate 15e. Reference numeral 29 designate a green tire to be vulcanized and reference numeral 30 does a green tire holding stand.

A green tire 29 held on the green tire holding stand 30 is grasped by means of the pawls 18 and 19 and it is then raised up together with the pawls 18 and 19 by actuating the hydraulic cylinder 4 in the upward direction. When the hydraulic cylinder 24 is caused to expand after the green tire 29 is raised up to the predetermined height, the boom 15 is turned about the guide rod 6 until the nut 26 at the foremost end of the stopper rod 24 comes in abutment against the stopper 25 whereby the green tire 29 is located in vertical alignment with the center of a die 1a fixedly mounted on the housing 1 of the tire vulcanizing machine. Thereafter, the hydraulic cylinder 4 is retracted downward until the green tire 29 assumes the predetermined positional height. Then, as the hydraulic cylinder 20 is caused to contract, the pawls 18 and 19 are displaced toward the center of the chuck casing 17 along the guide grooves 17a formed on the latter and thereby the green tire 29 is released from the grasped state. On completion of releasing operation for the green tire 29 the hydraulic cylinder 4 is actuated to reach the required height while the hydraulic cylinder 27 is caused to contract so that the stopper 25 comes in abutment against the one end part 24a of the stopper rod 24 and thereby the boom 15 is stopped. Next, the hydraulic cylinder 4 is actuated in the downward direction so as to insert the pawls 18 and 19 into another green tire 29 to be vulcanized and thereafter the hydraulic cylinder 20 is actuated in the direction of expansion whereby the pawls 18 and 19 are displaced outward until the green tire 29 is grapsed by them. Thus, the arrangement as illustrated in FIG. 2 is assumed and one cycle of operations has been completed.

As will be readily understood from the above description, owing to the arrangement that the common board 11 is raised up or lowered with the aid of a pair of guide rods 6 it is assured that a green tire is precisely transferred with substantial reduction of deflection of the guide rods 6 as well as undesirable displacement of the same due to clearance between the common board 11 and the guide rod 6. Thus, loading operation can be carried out by means of a loader at a remarkably improved accuracy. Further, owing to the arrangement that a pair of booms 15 are separately turned about each of the guide rods 6 it becomes possible that the guide rods 6 serve both for raising and lowering operation of the booms 15 and for turning movement of the same. Thus, a loader having an excellently high accuracy can be provided at an inexpensive cost. Further, owing to the arrangement that the stopper rod 24 is adapted to move slidably relative to the turnable boom 15 and its limitative position at the stroke end during the turning movement of the boom 15 is mechanically determined with the aid of locking means such as nut 26 or the like means it is assured that the booms 15 are precisely stopped at the stroke end of their turning movement while fine controlling is conducted. Thus, remarkably improved accuracy of operation is achieved, compared with the conventional stopper type where a stopper is disposed at the position located in the vicinity of the center of turning movement, because in the illustrated embodiment of the invention positional locking is carried out at the position located on the boom 15 remote from the center of radius thereof.

The reason why a stopper is disposed only at the position located in the proximity of the center of turning movement of boom in the conventional tire vulcanizing machine is attributable to the fact that an upper die half is adapted to move up and down on a vulcanizing machine and therefore any stopper cannot be installed on the center line of a die mounted on the lower frame of the vulcanizing machine. It should be noted that there is existent another limitative condition with respect to required space in dependence on structure, utilization or the like of the vulcanizing machine. On the other hand, a loader in accordance with this embodiment where the stopper is arranged in the above-described manner does not suffer from any of these limitative conditions and therefore remarkably effective locking fucntion is assured.

Figures 4, 5:
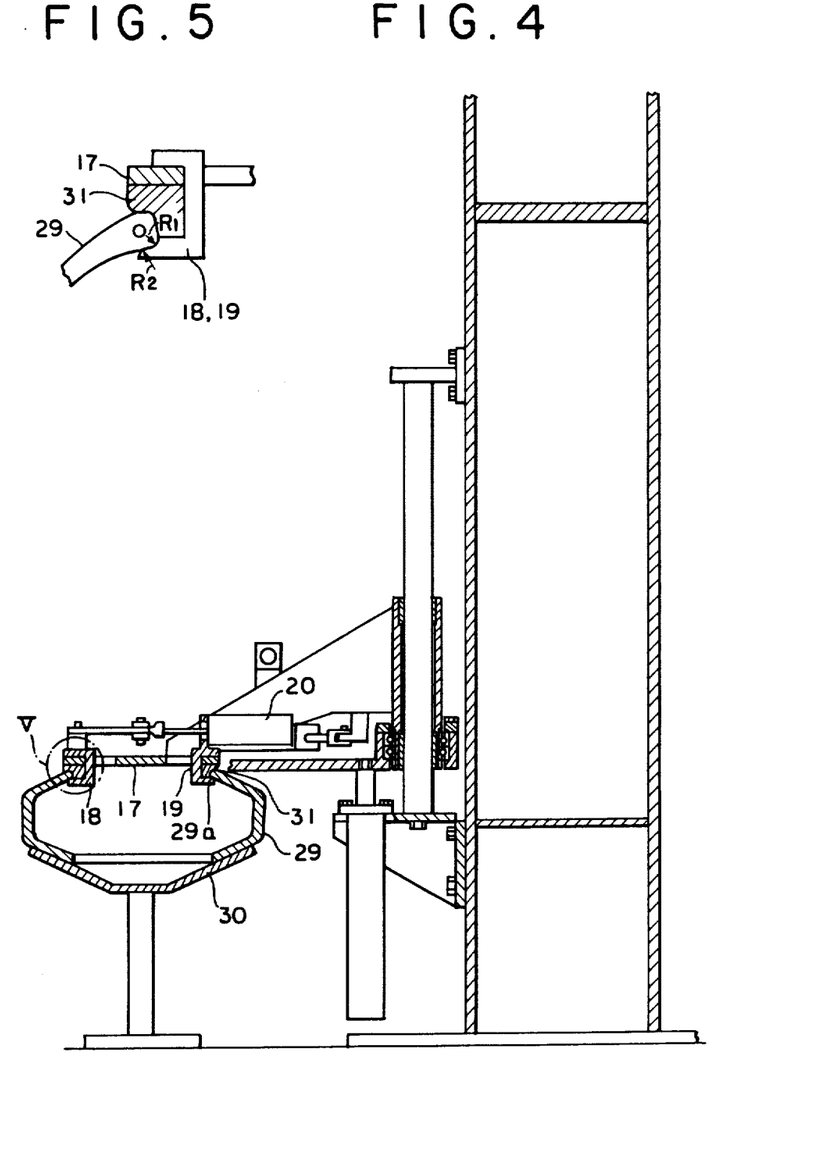
FIG. 4 is a sectional view of a loader in accordance with the second embodiment of the invention.
FIG. 5 is an enlarged sectional view of the section V in FIG. 4.

Next, a loader in accordance with another embodiment of the invention will be described with reference to FIGS. 4 and 5.

As illustrated in the drawings, a ring 31 is fixedly secured to the chuck casing 17 by means of bolts or the like and its peripheral part is designed so as to accomodate to the configuration of a bead portion 29a of a green tire 29 to be vulcanized. The lower end part of each of the pawls 18 and 19 at which it comes in contact with the green tire is also designed so as to accomodate to the configuration of the lower part of the bead portion 29a. Specifically, it comprises a concave portion $R_1$ (or tapered portion) and a convex relief portion $R_2$ (or tapered relief portion) so as to facilitate guiding of the lower surface of the bead portion 29a, illustrated in FIG. 5.

This embodiment makes it possible to replace the ring 31 with another one of which outer peripheral configuration is determined so as to accomodate to new dimentions when there occurs necessity for changing bead size of a tire to be vulcanized, while reliable tire grasping is kept unchanged. Since structure and function other than those as described above are quitely same to those in the foregoing first embodiment, their repeated description will not be required.

Next, a loader in accordance with still another embodiment of the invention will be described with reference to FIGS. 6 and 7.

Figures 6, 7:
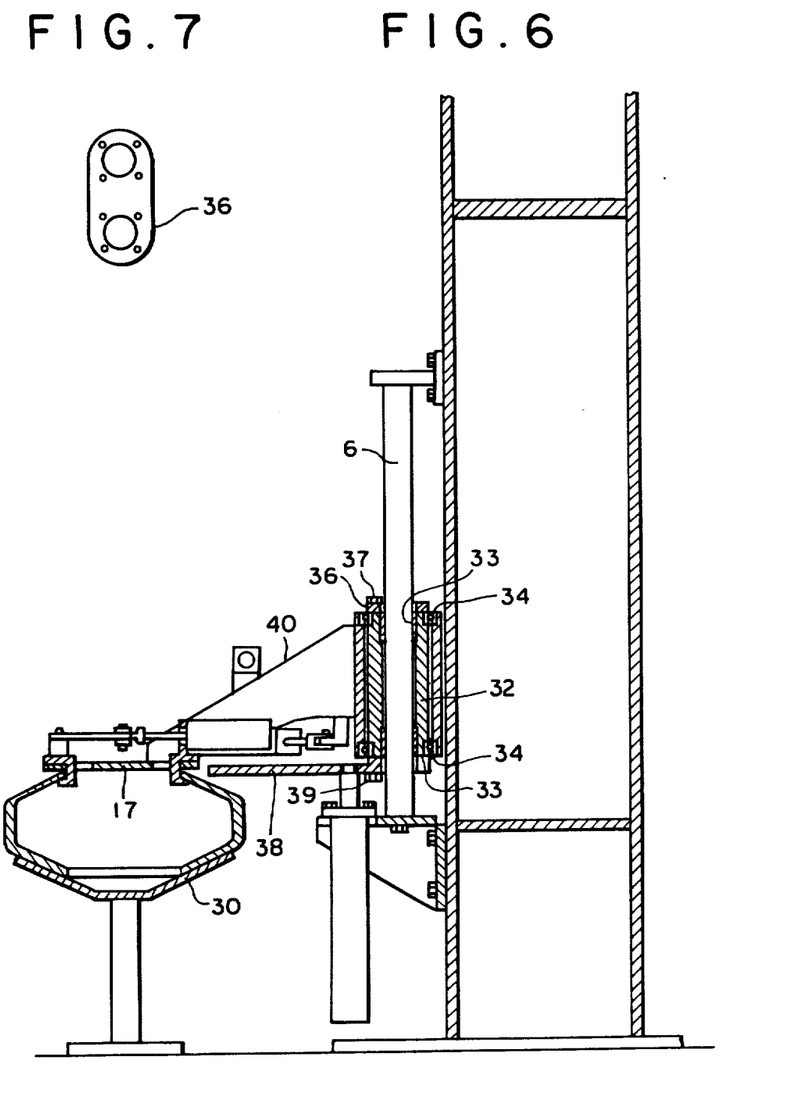
FIG. 6 is a sectional side view of a loader in accordance with the third embodiment of the invention.
FIG. 7 is a plan view of a flange to be secured to a sleeve slidably fitted on a guide rod constituting the loader in FIG. 6.

As is apparent from FIG. 6, a pair of sleeves 32 are slidably fitted onto the guide rods 6 with the aid of bushes 33 firmly inserted into both the upper and lower end parts thereof and moreover ball bearings 34 are disposed at both the upper and lower end parts of the sleeves 34 in such a manner that their inner race is press fitted onto the latter. A flange 36 is fastened to the upper end of the sleeves 32 by means of bolts 37 (see FIG. 7), whereas as common board 38 is fastened to the lower end of the sleeves 32. Both the upper and lower end parts of vertically extending cylinderical members on the booms are press fitted with outer races of the ball bearings 34. Structure and function of the loader other than those as described above are same to those in the first embodiment and their description will not be required.

The present invention has been described above with these embodiments but it should be of cource understood that the invention should not be limited only to them. Alternatively, the height of the loader casing 17 (tire grasping member) may be adjusted by means of a male threaded rod or the like relative to the boom 15, particularly in case when two tires to be vulcanized have a different height from one another.

Figure 9:
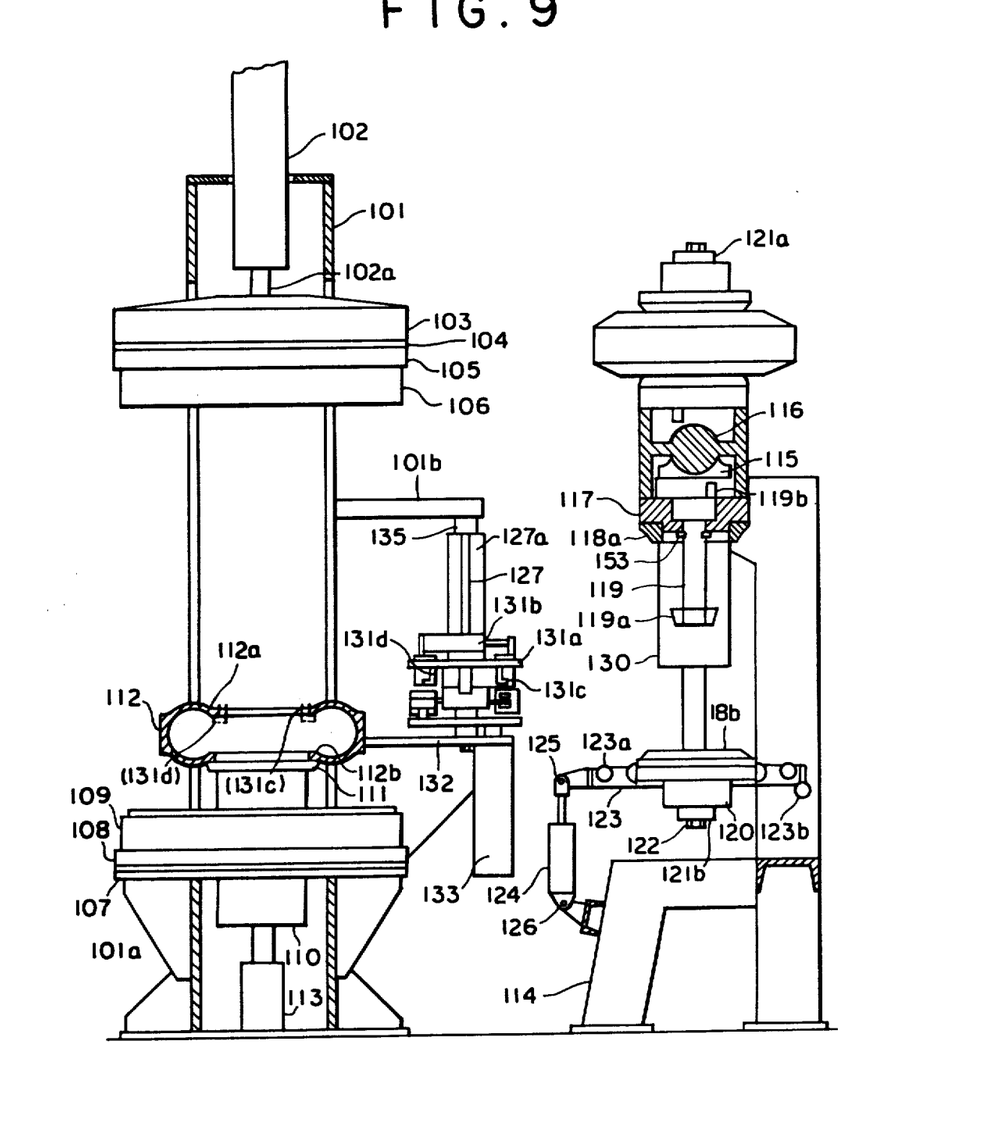
FIG. 9 is a sectional side view of the unloader in FIG. 8.
Figure 10:
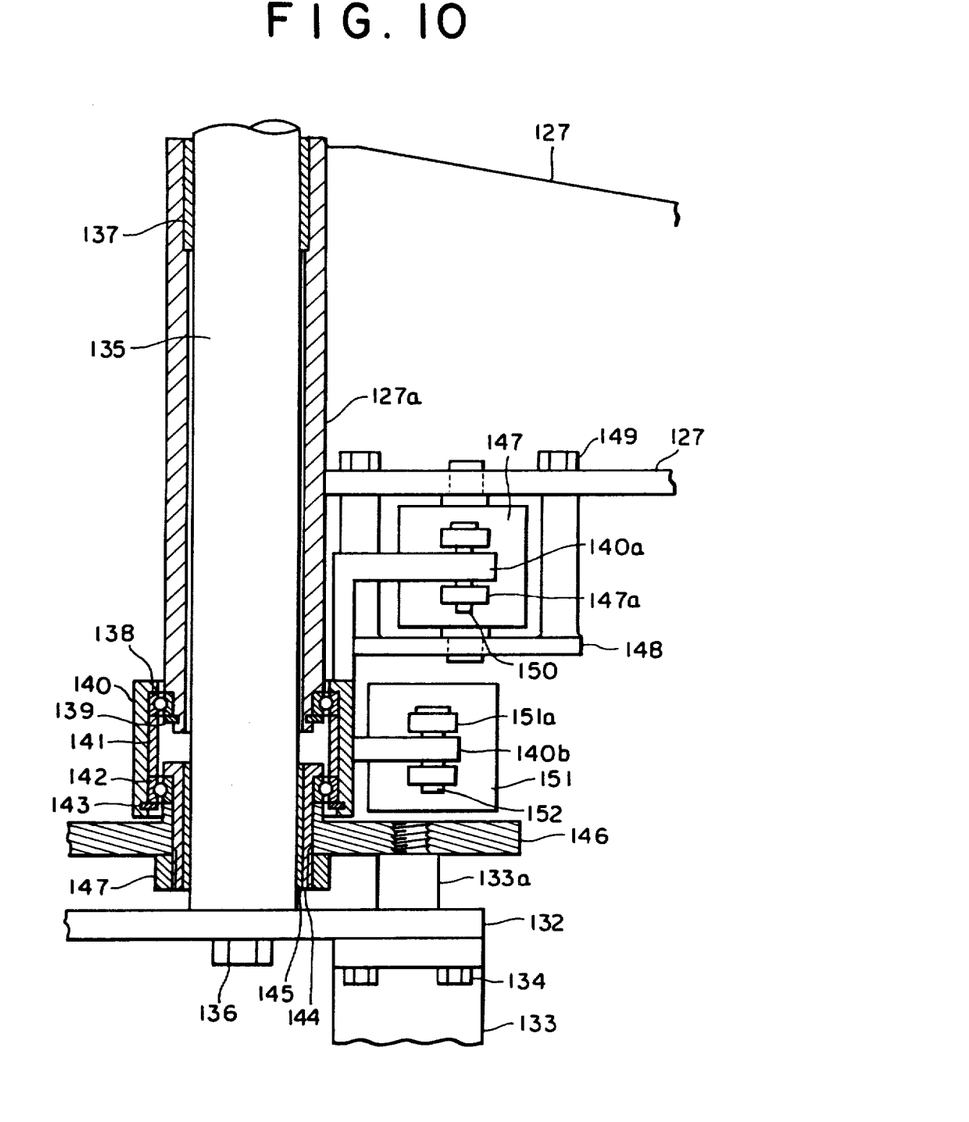
FIG. 10 is an enlarged sectional view of an essential part constituting the unloader in FIGS. 8 and 9.

Next, an unloader in accordance with an embodiment of the invention will be described with reference to FIGS. 8 to 10.

A depressing hydraulic cylinder 102 disposed above a housing 101 of a vulcanizing press is fitted to a bolster 103 by screwing the male threaded part of a rod 102a into the female threaded hole on the bolster 103. An upper thermal insulating plate 104, an upper hot plate 105 and an upper die half 106 are fastened to the bolster 103 by means of bolts. As the hydraulic cylinder 102 is actuated by hydraulic pressure, the upper die half 106 is raised up or lowered by means of the rod 102a of the hydraulic cylinder 102. On the other hand, a lower thermal insulating plate 107, a lower hot plate 108 and a lower die half 109 are fixedly mounted on the upper surface of a circular plate 101a disposed at the lower part of the housing 101 by means of bolts. Each of the lower thermal insulating plate 107, the lower hot plate 108 and the lower die half 109 is formed with a cylindrical hole at the central part thereof through which a bead lifter 110 is slidably fitted. Further, a lower bead ring 111 is fastened to the bead lifter 110 with the aid of a bayonet mechanism.

A vulcanized tire 112 can be displaced upward by means of the bead lifter 110 and the bead ring 111 as a hydraulic cylinder 113 is actuated.

A rotary shaft 116 fitted into a bearing 115 mounted on the upper part of a post-cure inflator stand 114 (hereinafter referred to as PCI stand) is arranged so as to turn by 180 degrees with the aid of a rotational mechanism. A circular disc 117 is fastened to the rotary shaft 116 by means of bolts or the like. Further, an upper post-cure inflator ring 118a (hereinafter referred to as upper PCI ring) is secured to the lower surface of the circular disc 117, whereas a bayonet 119 is rotatably fitted through the central part of the circular disc 117 with the aid of a snap ring 153. The lowermost end part 119a of the bayonet 119 is designed in the bayonet-shaped configuration and a pin 119b is provided at the upper end of the bayonet 119 for the purpose of rotating the same.

A bayonet ring 120 has a bayonet portion 120a formed around the inner surface thereof so as to accomodate to the configuration of the lowermost end part 119a of the bayonet 120 and a lower post-cure inflator ring 118b (hereinafter referred to as lower PCI ring) is fastened to the upper surface of the bayonet ring 120 by means of bolts or the like while a link 121b is fastened to the lower surface of the same by means of a bolt 122.

A roller conveyor 123 comprises a plurality of rollers 123a each of which is rotatably supported thereon and it is adapted to incline about a pin 123b to a required inclination angle by actuating a hydraulic cylinder 124 in the upward direction. Pins 125 and 126 serve as a pivotal axis for both the upper and lower ends of the hydraulic cylinder 124 so that the latter is operatively connected to the roller conveyor 123.

The link 121b has the bayonet rings 120 carried at the outermost ends thereof and a crevice 129 is fixedly connected to the central part of the link 121b by means of a pin 128. Reference numeral 130a represents the cross-sectional configuration of an actuating rod of a hydraulic cylinder 130 of which head portion is operatively connected to an upper link 121a by means of a pin (not shown).

A boom 127 includes a chuck casing 131a fixedly secured thereto by means of bolts or the like so that a vulcanized tire 112 is grasped at the inner periphery of its upper bead by displacing pawls 131c and 131d outward along guide grooves on said chuck casing 131a or it is disconnected therefrom by inward displacement of said pawls 131c and 131d adapted to be expanded or contracted by means of a hydraulic cylinder 131b.

A bracket 132 is fixedly secured to the press housing 101 by means of bolts or the like so that a hydraulic cylinder 133 is attached to the lower side of said bracket 132 by means of bolts 134 while two vertically extending guide rods 135 are firmly mounted on the upper side of the same by means of bolts 135. The upper end part of the guide rods 135 is held with the aid of a horizontally extending support 101b fixed to the press housing 101.

The one end part of the boom 127 is attached to a sleeve 127a of which upper part is press fitted with a bush 137 through which the guide rod 135 is slidably extended. The lower end part of the sleeve 127a is press fitted with an inner race of an upper ball bearing 138 which is inhibited from disconnecting therefrom by means of a snap ring 139. An outer sleeve 140 is press fitted with an outer race of the ball bearing 138 at the upper end part thereof, a spacer is disposed below said outer race of the ball bearing 138 and moreover said outer sleeve 140 is press fitted with an outer race of a lower ball bearing 142 at the position located below said spacer 141, said lower bearing 142 being inhibited from being disconnected from the outer sleeve 140 by means of a snap ring 143. A sleeve 144 has a bush 145 press fitted to the inner wall thereof so that the guide rod 135 is slidably extended through said bush 145. The sleeve 144 is formed with a male threaded portion at the lower part thereof so that the inner race of the lower ball bearing 142 is fixedly held between the flange portion of the sleeve 144 and the common board 146 by screwing a nut 147 onto the male threaded portion of the sleeve 144.

Further, a hydraulic cylinder 147 is swingably held by means of a cylinder support 148 and bolts 149 below the boom 127. A crevice 147a at the foremost end of an actuating rod of the hydraulic cylinder 147 is operatively connected to an arm 140a by way of a pin 150, said arm 140a being made integral with the outer sleeve 140.

The rear end part of a hydraulic cylinder 151 is pivotally connected to a pin 146a which is made integral with the common board 146, whereas a crevice 151a at the foremost end of an actuating rod of said hydraulic cylinder 151 is operatively connected to an arm 140b by way of a pin 152, said arm 140b being made integral with the outer sleeve 140. On the other hand, the uppermost end part 133a of an actuating rod of the hydraulic cylinder 133 is fixed to the common board 146 by screwing it into a female threaded hole on the latter.

Figure 8:
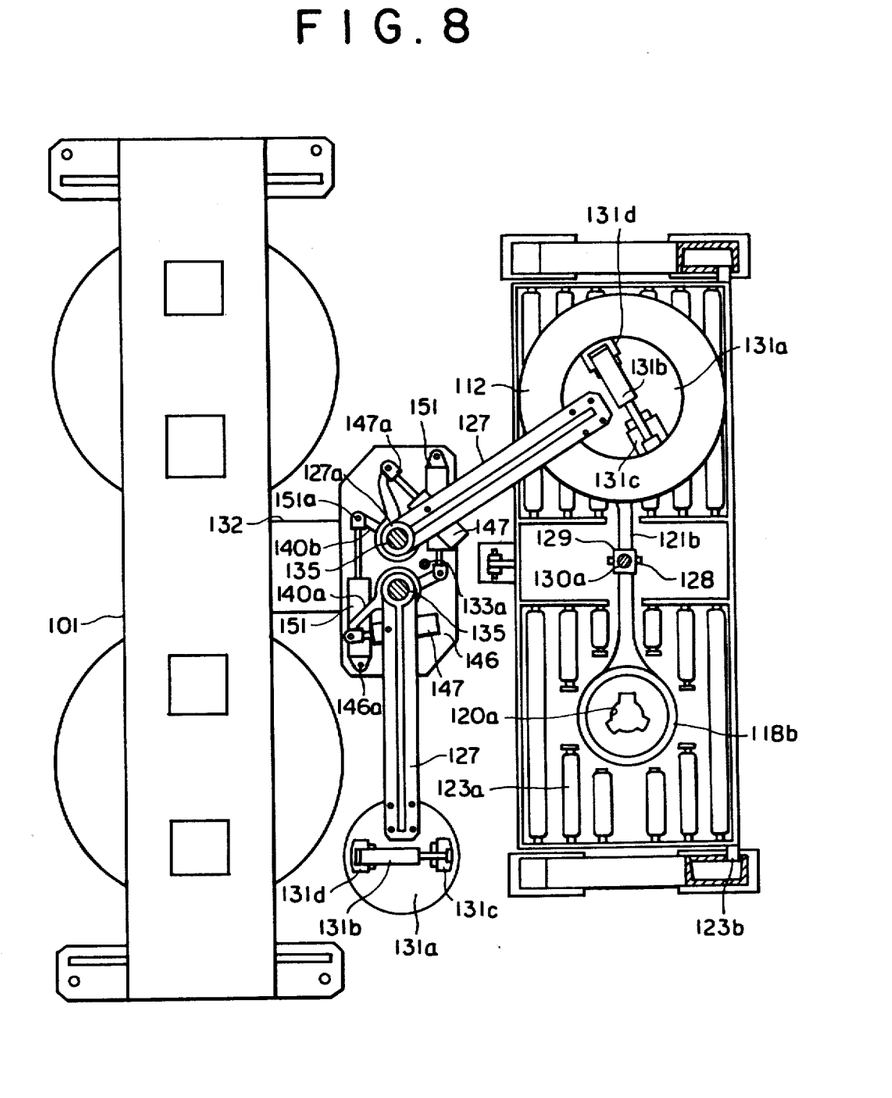
FIG. 8 is a plan view of an unloader in accordance with fourth embodiment of the invention.

As will be apparent from FIG. 8, a pair of chuck assemblies are arranged (comprising a combination of both the upper and lower ones as seen in the drawing) and parts and components for actuating each of the chuck assemblies as identified with the same reference numerals are also arranged in the form of a pair.

On completion of vulcanizing process the depressing hydraulic cylinder 102 is caused to actuate in the upward direction with the aid of a hydraulic pressure control device until it reaches the uppermost positional limit at which it comes to a stop. Next, the hydraulic cylinder 113 initiates its upward actuation so that a vulcanized tire 112 is lifted up away from the lower die half 109 by means of the lower bead ring 111 to the predetermined height at which it is held stationarily. One of the chuck assemblies 131a to 131d which has been kept at the waiting position is then transferred to the position located above the vulcanized tire 112 by actuating the hydraulic cylinder 151 in the direction of expansion. Next, the hydraulic cylinder 133 is actuated in the downward direction so as to lower the common board 146 and thereafter the hydraulic cylinder 131b is caused to expand so as to displace both the pawls 131b and 131c outward until they are engaged to the upper bead 112a of the vulcanized tire 112 as represented by dotted lines in FIG. 9 to hold the latter. On completion of tire grasping the hydraulic cylinder 133 is actuated in the upward direction to the uppermost positional limit and thereafter the hydraulic cylinder 147 is caused to expand while the hydraulic cylinder 151 is caused to contract or expand at the same time whereby the chuck assembly 131a to 131d is displaced to the position located above the PCI ring 118b by turning movement. The hydraulic cylinder 133 is then actuated in the downward direction so as to cause the lower bead 112b of the vulcanized tire 112 to be inserted into the lower PCI ring 118b. After the vulcanized tire 112 is placed on the lower PCI ring 118b, operations are carried out by way of the reverse steps to those as mentioned above so that the chuck assembly 131a to 131b is restored to the waiting position.

Next, the hydraulic cylinder 130 is caused to contract until the upper bead 112a of the vulcanized tire 112 is brought in tight contact with the upper PCI ring 118a and thereafter the pin 119b at the upper end of the bayonet 119 is rotated with the aid of a hydraulic cylinder or the like means. Thus, the vulcanized tire 112 is firmly held with the aid of the bayonet mechanism comprising the lowermost end part 119a of the bayonet 119 and the bayonet portion 120a so that it is inflated by introducing compressed air therein through an air intake port formed on the bayonet mechanism.

After a predetermined period of time has elapsed, the rotary shaft 116 is turned by 180 degrees by actuating the rotational mechanism and thereafter the vulcanized tire 112 is removed away by way of the reverse steps to those as mentioned above.

When the hydraulic cylinder 124 is actuated in the upward direction, the roller conveyor 123 is turned about the pin 123b until the required inclination is achieved. Thus, the vulcanized tire is lifted up from the lower PCI ring 118b starting with the horizontal posture as illustrated in FIG. 9 and it is then transferred to the outside while sliding on the rollers 123a under the influence of gravity force thereof. As a result one cycle of operations has been completed.

The unloader in accordance with this embodiment has the following advantageous features.

(1) Since a vulcanized tire is transferred from the center of a die on a vulcanizing press directly onto the PCI ring while it is grasped at the bead portion having the highest ridigity in the tire structure with the horizontal posture maintained at all time, it is assured that the vulcanized tire is located in correct vertical alignment with the PCI ring precisely and reliably. Thus, remarkably improved stability of function as well as substantially improved uniformity of vulcanized tires are obtainable without any additional arrangement of complicated mechanisms, compared with the conventional unloader in which vulcanized tires are adapted to slide on an inclined conveyor. As is widely known, a post-cure inflator (hereinafter referred to as PCI) is constructed such that a vaulcanized tire is caused to inflate and it is then subjected to air cooling while it is deformed during air cooling due to stretching of codes in the tire caused by inflating and therefore precise setting of the tire on PCI contributes to improvement in quality of vulcanized tires. It has been found that the unloader of the invention satisfactorily meets requirements for the above-mentioned improvement.

(2) Since an arrangement is made so that vulcanized tires are directly transferred, transferring time can be reduced much more than the conventional unloader with few deformation caused due to cooling during the transferring, which will lead to reduction of cycle time of a vulcanizing machine.

(3) Owing to the arrangement that raising and lowering are carried out with the aid of two vertically extending guide rods 135 it is assured that the unloader has an improved functional accuracy. Moreover, since a pair of unloaders serve as both guiding means and raising and lowering means, the whole structure can be substantially simplified.

(4) When the unloader is to be turned, there is necessity for precisely controlling three position comprising the center of vulcanizing machine, waiting position and the center of PCI and particularly, the center of vulcanizing machine and the center of PCI are required to be positioned with high accuracy. Since the unloader of the invention is constructed such that turning movement is carried out among the above-mentioned three positions with the air of two hydraulic cylinders while each of the positions is determined at the stroke end of each of the hydraulic cylinders (or a little bit before the stroke end of the same) by means of a mechanical stopper, simple and reliable operations of the unloader are achieved.

(5) Since a roller conveyor on PCI is inclinable, movement of vulcanized tires on PCI can be conducted very easily without any fear of causing interferrence with operations of the unloader.

While the present invention has been described only with respect to the illustrated embodiment, it should be of cource understood that the invention should not be limited only to this. Alternatively, the invention may be embodied in the following modified manners.

(1) A type of the vulcanizing press should not be limited only to the illustrated one. A mechanical crank type press may be employed which has been hitherto put in use in many fields.

(2) Turning movement of the unloader may be replaced with horizontal linear movement or a combination of horizontal linear movement and partial inclinating movement any of which can be practiced easily in accordance with any hitherto known technique.

(3) The number of chuck pawls 131c and 131d and a system of engagement and disengagement of the same should not be limited to those as illustrated in the accompanying drawings. Alternatively, those as employed in the conventional green tire loading device for a vulcanizing press for which many proposals have been already made are acceptable. Further, chuck pawls of a type including a ring adapted to be loosely fitted to the inner periphery of a tire bead, a plurality of pawls adapted to expand and contract in the radial direction, a curved part designed to accomodate substantially to the configuration of the tire bead at the fore end of said pawls and an inclined part at the fore end of the same may be employed.

(4) When the unloader of the type as illustrated in the accompanying drawings is employed, it becomes possible that a vulcanized tire is removed from the lower die half 109 without any use of the bead lifter 110 merely by reinforcing the unloader.

(5) In the illustrated embodiment a pair of unloaders are adapted to be actuated by means of a single raising and lowering mechanism. Alternatively, each of the unloaders may be separately actuated by means of a corresponding raising and lowering mechanism.

(6) It is possible that PCI is constructed in a variety of types. In the illustrated embodiment a vulcanized tire is adapted to enter PCI below the rotary shaft 116 but it is possible that it enters PCI at the upper part thereof by changing the height of PCI or the like.

(7) In a vulcanizing machine of the type where a tire to be vulcanized is fitted onto the upper die half and both the upper and lower die halves are parted away from one another on completion of vulcanization an arrangement is made in the reverse manner to the illustrated embodiment. Specifically, a vulcanized tire is placed on PCI by way of the steps of disconnecting it from the upper die half, holding it from the lower side, transferring it to PCI and then turning the unloader by 180 degrees with the aid of an additional mechanism. Alternatively, it may be placed on PCI by way of the steps of setting it onto the upper PCI ring without any turning movement by 180 degrees and then causing the lower PCI ring to come in engagement thereto while it is kept in the suspended state with the aid of an additional tire grasping device.

While the present invention has been described above with respect to the illustrated embodiments, it should be of cource understood that the invention should not be limited only to them but various changes or modifications may be made in a suitable manner without any departure from the spirit and scope of the invention.

What is claimed is:

1. An apparatus for loading or unloading tires for a tire vulcanizing machine, characterized in that said apparatus essentially comprises a pair of vertically extending guide rods fixedly secured to a housing of the tire vulcanizing machine, a common board slidably fitted onto said guide rods so as to be displaced in the vertical direction with the aid of driving means, a pair of booms adapted to be displaced in the vertical direction together with said common board, each of said booms being turnable about the guide rod, tire grasping means including a plurality of grasping pawls disposed at the one end of each of the booms, said grasping pawls being adapted to expand or contract, and means for limiting the extent of turning movement of the boom.

2. An apparatus for loading or unloading tires for a tire vulcanizing machine as defined in claim 1, characterized in that each of the booms is rotatably fitted to the common board.

3. An apparatus for loading or unloading tires for a tire vulcanizing machine as defined in claim 1, characterized in that each of the booms is adapted to turn about the guide rod with the aid of a hydraulic cylinder which is operatively connected between the common board and the boom.

4. An apparatus for loading or unloading tires for a tire vulcanizing machine as defined in claim 1, characterized in that the driving means for displacing the common board in the vertical direction comprises a hydraulic cylinder which is operatively connected between the housing of the tire vulcanizing machine and the common board.

5. An apparatus for loading or unloading tires for a tire vulcanizing machine as defined in claim 1, characterized in that the means for limiting the extent of turning movement of the boom comprises a mechanical stopper disposed between the common board and the boom.

6. An apparatus for loading or unloading tires for a tire vulcanizing machine as defined in claim 3, characterized in that the means for limiting the extent of turning movement of the boom becomes effective at the stroke end of the hydraulic cylinder which serves to turn the boom.

7. An apparatus for loading tires for a tire vulcanizing machine as defined in claim 1, characterized in that the pair of guide rods are disposed in front of the housing of the tire vulcanizing machine and each of the booms is turnable between a tire holding stand disposed at the position located at a certain distance forward of the tire vulcanizing machine and the center of a die on the tire vulcanizing machine.

8. An apparatus for unloading tires for a tire vulcanizing machine as defined in claim 1, characterized in that the pair of guide rods are disposed behind the housing of the tire vulcanizing machine and between the latter and a post-cure inflator and each of the booms is turnable between the center of a die on the tire vulcanizing machine and the center of rings on the post-cure inflator.

9. An apparatus for loading tires for a tire vulcanizing machine, characterized in that said apparatus essentially comprises a hydraulic cylinder fixedly secured to a stationary bracket, said hydraulic cylinder including an actuating rod adapted to expand or contract in the vertical direction, a pair of vertically extending guide rods fixedly mounted on said bracket, a common board slidably fitted onto the pair of guide rods at the one end part thereof, said common board being adapted to move up and down with the aid of said hydraulic cylinder of which actuating rod is fixedly connected to the common board at its uppermost end, a pair of booms slidably fitted onto the guide rods at the one end part and carrying tire grasping means at the other end part thereof, said tire grasping means comprising a plurality of grasping pawls adapted to expand and contract, a pair of second hydraulic cylinders for turning each of the booms about the guide rods, the one end part of each of said second hydraulic cylinders being operatively connected to the boom at the position located intermediate the common board and the boom, and a pair of stopper rods operatively connected to the common board at the one end part and carrying a stop member at the other end part thereof, each of said stopper rods extending through a hole on a stopper turnably disposed at the middle part of the boom in such a manner as to slide through said hole as the boom is turned.

10. An apparatus for loading tires for a tire vulcanizing machine as defined in claim 9, characterized in that the tire grasping means includes a ring of which configuration is determined so as to accomodate to bead size of a tire to be loaded.

11. An apparatus for loading tires for a tire vulcanizing machine as defined in claim 9, characterized in that the stop member at the free end of each of the stopper rods comprises a nut screwed onto the male threaded end part of the stopper rod so as to make fine adjustment with respect to a working stroke of the stopper rod.

12. An apparatus for unloading tires for a tire vulcanizing machine, characterized in that said apparatus essentially comprises a pair of vertically extending guide rods disposed at the predetermined position located between the tire vulcanizing machine and the post-cure inflator, each of said guide rods being fixedly secured to the tire vulcanizing machine by way of a bracket extending therebetween, a pair of booms slidably fitted onto the guide rods at the one end part thereof so as to turn between two positions with the aid of hydraulic cylinders, one of said positions being the center of a die on the tire vulcanizing machine while the other one being the center of post-cure inflator rings on the post-cure inflator, each of said booms being adapted to move up and down along the guide rods, and tire grasping means disposed at the other end part thereof for grasping a vulcanized tire at the bead portion, said tire grasping means including a plurality of grasping pawls adapted to expand and contract.

13. An apparatus for unloading tires for a tire vulcanizing machine as defined in claim 12, characterized in that the guide rods, the booms and the tire grasping means are provided in the form of a pair respectively.

14. An apparatus for unloading tires for a tire vulcanizing machine as defined in claim 13, characterized in that the pair of booms are turnably provided on a common board.

15. An apparatus for unloading tires for a tire vulcanizing machine as defined in claim 14, characterized in that the pair of booms are displaced in the vertical direction by displacing the common board in the vertical direction with the aid of a raising and lowering means.

16. An apparatus for unloading tires for a tire vulcanizing machine as defined in claim 12, characterized in that turning movement of the booms to the center of the die and turning movement of them to the center of the post-cure inflator are separately carried out by means of a specific hydraulic cylinder.

* * * * *